United States Patent
Anholt et al.

(10) Patent No.: US 9,804,828 B2
(45) Date of Patent: Oct. 31, 2017

(54) CUBIC ROOT OF A GALOIS FIELD ELEMENT

(71) Applicant: APPLE INC., Cupertino, CA (US)

(72) Inventors: Micha Anholt, Tel Aviv (IL); Moti Teitel, Tel Aviv (IL)

(73) Assignee: APPLE INC., Cupertino, CA (US)

( * ) Notice: Subject to any disclaimer, the term of this patent is extended or adjusted under 35 U.S.C. 154(b) by 148 days.

(21) Appl. No.: 14/551,110

(22) Filed: Nov. 24, 2014

(65) Prior Publication Data

US 2016/0147504 A1    May 26, 2016

(51) Int. Cl.
G06F 7/552    (2006.01)
G06F 7/72     (2006.01)

(52) U.S. Cl.
CPC .............. G06F 7/724 (2013.01); G06F 7/552 (2013.01); G06F 7/5525 (2013.01); G06F 2207/5526 (2013.01)

(58) Field of Classification Search
CPC ........ G06F 7/552–7/5525; G06F 7/724; G06F 2207/5526
USPC ......................................................... 708/492
See application file for complete search history.

(56) References Cited

U.S. PATENT DOCUMENTS

| | | | |
|---|---|---|---|
| 5,710,782 A | 1/1998 | Weng | |
| 5,761,102 A | 6/1998 | Weng | |
| 5,771,244 A | 6/1998 | Reed et al. | |
| 5,905,740 A | 5/1999 | Williamson | |
| 6,199,088 B1 | 3/2001 | Weng et al. | |
| 6,199,188 B1 | 3/2001 | Shen et al. | |
| 6,279,023 B1 | 8/2001 | Weng et al. | |
| 8,099,655 B1 | 1/2012 | Tan et al. | |
| 2003/0140078 A1 | 7/2003 | Feuser | |
| 2010/0306299 A1 | 12/2010 | Reidenbach | |

FOREIGN PATENT DOCUMENTS

JP    S6432154 A    2/1989

OTHER PUBLICATIONS

U.S. Appl. No. 14/555,612 Office Action, dated Mar. 7, 2016.
Doliskani et al., "Taking Roots over High Extensions of Finite Fields", 12 pages, Oct. 19, 2011 (http://arxiv.org/abs/1110.4350).

(Continued)

*Primary Examiner* — Matthew Sandifer
(74) *Attorney, Agent, or Firm* — D.Kligler IP Services Ltd.

(57) ABSTRACT

A method includes receiving a first element of a Galois Field of order $q^m$, where q is a prime number and m is a positive integer. The first element is raised to a predetermined power so as to form a second element z, wherein the predetermined power is a function of $q^m$ and an integer p, where p is a prime number which divides $q^m-1$. The second element z is raised to a $p^{th}$ power to form a third element. If the third element equals the first element, the second element multiplied by a $p^{th}$ root of unity raised to a respective power selected from a set of integers between 0 and p-1 is output as at least one root of the first element.

20 Claims, 5 Drawing Sheets

(56) References Cited

OTHER PUBLICATIONS

Barreto et al., "Efficient Computation of Roots in Finite Fields", Designs, Codes and Cryptography, vol. 39, 8 pages, May 2006.
Smith et al., "Staircase Codes: FEC for 100 Gb/s OTN", Journal of Lightwave Technology, vol. 30, No. 1, pp. 110-117, Jan. 1, 2012.
Guajardo et al., "Efficient Algorithms for Elliptic Curve Cryptosystems", Lecture Notes in Computer Science, vol. 1294, pp. 342-356, year 1997.
Satoh et al., "A Compact Rijndael Hardware Architecture with S-Box Optimization", Lecture Notes in Computer Science, vol. 2248, pp. 239-254, year 2001.

CUBIC ROOT OF A GALOIS FIELD ELEMENT

TECHNICAL FIELD

Embodiments described herein relate generally to operating with Galois Field elements, and particularly to methods and systems for finding a root of a Galois Field element.

BACKGROUND

Algebraic decoders may use operations on Galois Field elements to decode error correction codes. The operations typically include extracting a cubic root of an element, and methods for such extraction are known in the art. For example, U.S. Pat. No. 6,199,188, to Shen et al., whose disclosure is incorporated herein by reference, provides functional block diagrams of systems for determining the cube roots of elements of $GF(2^{2m+1})$ and $GF(2^{2m})$.

U.S. Pat. No. 5,761,102, to Weng, whose disclosure is incorporated herein by reference, describes a system and method for determining the cube root of an element $\alpha^{3k}$ of a Galois Field $GF(2^{2m})$. In determining the cube root, the system uses a look-up table to determine the cube root of $\alpha^{3k(2m\pm1)}$.

U.S. Pat. No. 5,905,740, to Williamson, whose disclosure is incorporated herein by reference, describes a cube root computation that utilizes logarithmic and anti-logarithmic tables as well as a division by 3 module.

An article titled "Efficient Computation of Roots in Finite Fields," by Barreto et al., and published in Designs, Codes and Cryptography, May 2006, Volume 39, is incorporated herein by reference. The article provides an algorithm that computes $r^{th}$ roots of an element of a Galois Field $GF(q^m)$ provided that q, m, r satisfy certain constraints.

Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

SUMMARY

An embodiment that is described herein provides a method including receiving a first element of a Galois Field of order $q^m$, where q is a prime number and m is a positive integer. The first element is raised to a predetermined power so as to form a second element z, wherein the predetermined power is a function of $q^m$ and an integer p, where p is a prime number which divides $q^m-1$. The second element z is raised to a $p^{th}$ power to form a third element. If the third element equals the first element, the second element multiplied by a $p^{th}$ root of unity raised to a respective power selected from a set of integers between 0 and p−1 is output as at least one root of the first element.

In some embodiments, m is an even integer, q=2, and p=3, so that the at least one root of the first element includes cube roots thereof. In an embodiment, the method includes determining that an order of a group associated with the Galois Field is not divisible by 9. In another embodiment, the predetermined power is selected from one of $$\frac{\frac{2^m-1}{3}+1}{3} \text{ and } \frac{2\left(\frac{2^m-1}{3}\right)+1}{3}.$$

In yet another embodiment, m=10, and the predetermined power is 114. In still another embodiment, the method includes determining that an order of a group associated with the Galois Field is divisible by 9 and not by 27. In still another embodiment, the predetermined power is selected from one of $$\frac{\frac{2^m-1}{9}+1}{3} \text{ and } \frac{2\left(\frac{2^m-1}{9}\right)+1}{3}.$$

In a disclosed embodiment, m=12, and the predetermined power is 152. In an example embodiment, an order of a group associated with the Galois Field is divisible by 9, and if the third element equals the first element multiplied by the cube root of unity, the method includes forming a fourth element as the second element divided by a cube root of the cube root of unity, and outputting as cube roots of the first element the fourth element, the fourth element multiplied by the cube root of unity, and the fourth element multiplied by the cube root of unity squared.

In another embodiment, an order of a group associated with the Galois Field is divisible by 9, and if the third element equals the first element multiplied by the cube root of unity squared, the method includes forming a fourth element as the second element divided by a cube root squared of the cube root of unity, and outputting as cube roots of the first element the fourth element, the fourth element multiplied by the cube root of unity, and the fourth element multiplied by the cube root of unity squared.

There is additionally provided, in accordance with an embodiment that is described herein, an apparatus including an exponentiation block, a power block, a comparison block and an output block. The exponentiation block is configured to receive a first element of a Galois Field of order $q^m$, where q is a prime number and m is a positive integer, and to raise the first element to a predetermined power so as to form a second element z, wherein the predetermined power is a function of $q^m$ and an integer p, where p is a prime number which divides $q^m-1$. The power block is configured to raise z to a $p^{th}$ power to form a third element. The comparison block is configured to compare the first and the third elements and to output an indication if the third element equals the first element. The output block is configured, in response to receipt of the indication, to output as at least one root of the first element the second element multiplied by a $p^{th}$ root of unity raised to a respective power selected from a set of integers between 0 and p−1.

There is further provided, in accordance with an embodiment that is described herein, a method including receiving a first element of a Galois Field of order $p^m$, where p is a prime and m is a positive integer, and decomposing r as a product $r_1 \cdot r_2 \ldots r_n$ of n integers $r_1, r_2, \ldots r_n$, where n is a positive integer. An $r_i$ root of a current value of the first element is iteratively extracted, where i is an integer index between 1 and n, to produce a second element. The second element respectively multiplied by successive elements of a set comprising $r^{th}$ roots of unity are output as $r^{th}$ roots of the first element.

These and other embodiments will be more fully understood from the following detailed description of the embodiments thereof, taken together with the drawings in which:

DETAILED DESCRIPTION OF EMBODIMENTS

Overview

An embodiment described herein provides apparatus and a method for finding the cube root of a Galois Field element. Typically the apparatus is implemented as circuitry that is formed as an integrated circuit, or as a portion of an integrated circuit. In contrast with other methods for finding the cube roots of a Galois Field element, embodiments described herein do not require the use of look-up tables, as will be apparent from the description.

Typically, the element is assumed to be of a Galois Field of order $2^m$, where m is an even integer. Such a Field has an associated group having an order that is always divisible by 3, and, depending on the value of m, that may be divisible by 9. In the following description, for clarity the element whose cube roots are to be determined is also referred to as the first element. The first element is raised to a power that is a function of m, so forming a second element. The function depends on how the group order divides into 3, or, for the cases where the order is divisible by 9, how it divides into 9.

The second element is cubed to form a third element, and the first and third elements are compared. If the first and third elements are equal, the cube roots of the first element are the second element, the second element multiplied by a cube root of unity, and the second element multiplied by the cube root of unity squared.

If the group order is divisible by 3 but not by 9, then if the first and third elements are not equal, there is no cube root of the first element. If the group order is divisible by 9, then even if the first and third elements are not equal, there may be cube roots of the first element, and these are found by embodiments described herein.

As stated above, the cube roots may be found without the use of look-up tables. In implementing embodiments described herein as circuitry, typically fabricated on a silicon substrate, there is thus a considerable area saving compared to systems using such tables. There are typically also significant power savings.

When m is a known value, such as 10 or 12, there is no requirement in the circuitry, or in the process performed by the circuitry, for a decision as to whether the order is divisible by 3 or divisible by 9. In these cases the circuitry, and its associated process, may be implemented specifically for the known value of m. Such implementations lead to a further saving of silicon area and of power.

System Description

Figure 1:
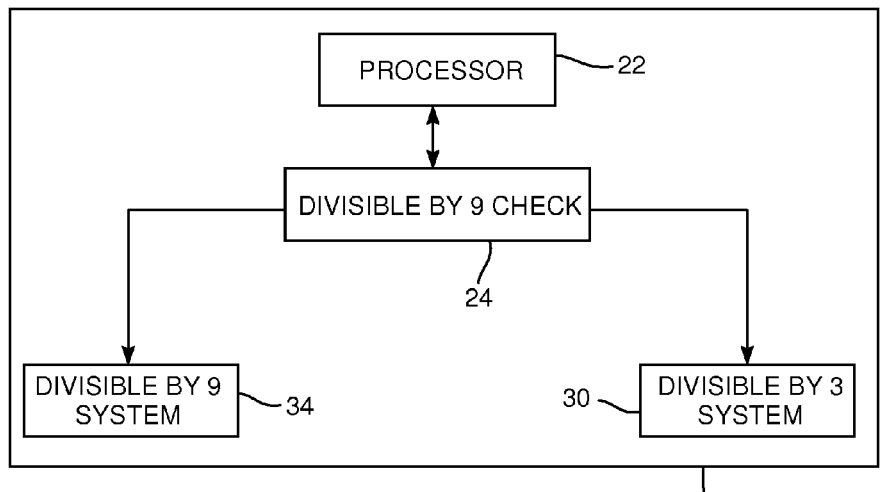
FIG. 1 is a block diagram that schematically illustrates circuitry for finding the cube roots of a Galois Field element, in accordance with an embodiment that is described herein.
Figure 2:
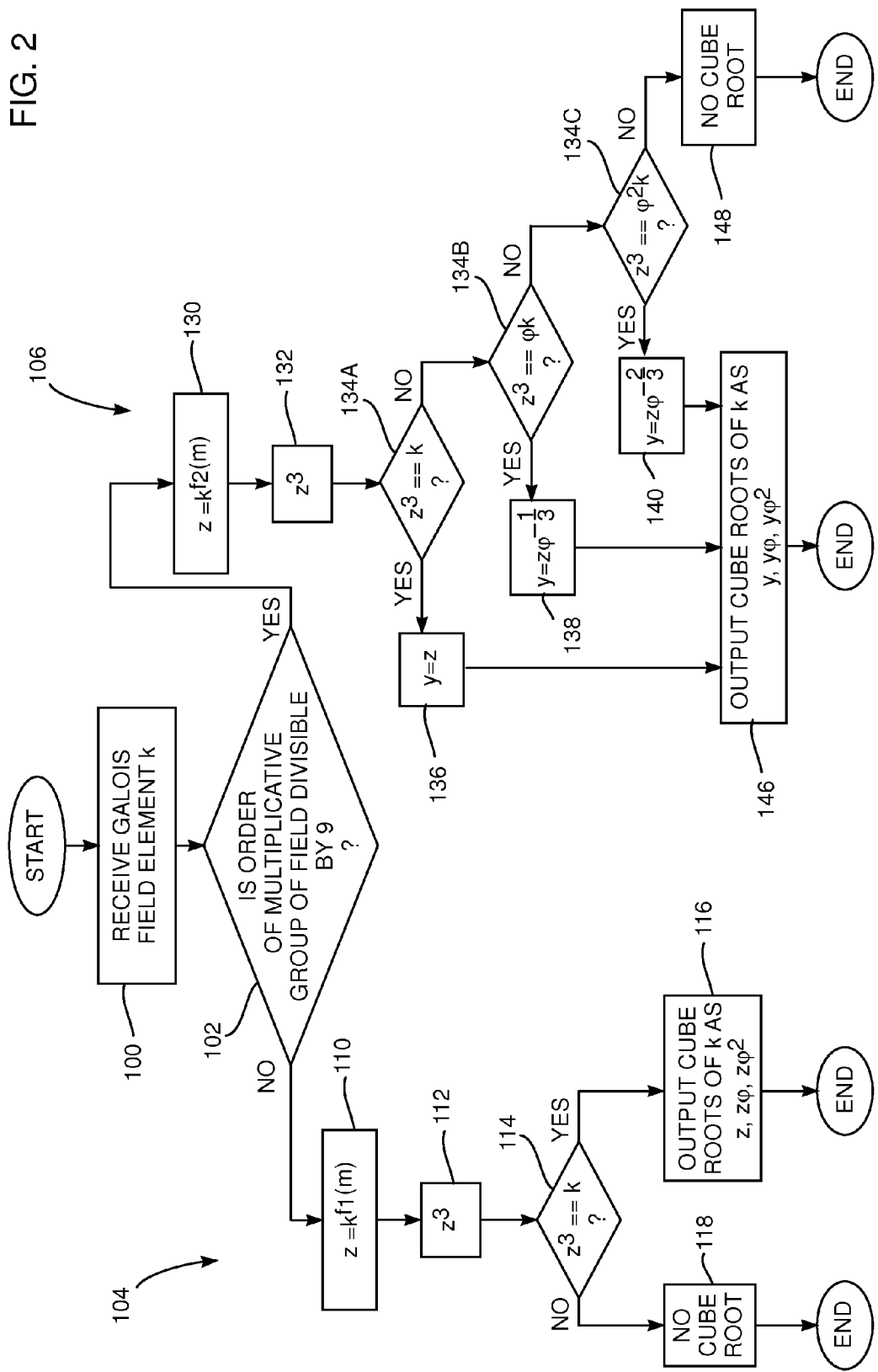
FIG. 2 is a flowchart of steps performed by the circuitry of FIG. 1, in accordance with an embodiment that is described herein.

Reference is now made to FIG. 1 which is a highly schematic block diagram of circuitry 20 that is configured to find the cube roots of a Galois Field element, in accordance with an embodiment that is described herein. Reference is also made to FIG. 2, which is a flowchart of steps performed by the circuitry, in accordance with an embodiment that is described herein.

Circuitry 20 may be implemented as an integrated circuit, or as a portion of an integrated circuit, that is fabricated on a semiconductor substrate that is typically comprised of silicon. In some embodiments the circuitry comprises a processor 22, which controls the operations of the remaining elements of the circuitry. Processor 22 may be a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory. In some embodiments, processor 22 may be one or more processors or processor cores capable of executing instructions stored on a non-transitive computer readable medium to perform and carry out the functions described herein.

In alternative embodiments, the circuitry does not comprise a processor and the elements of the circuitry are "hard-wired." For clarity, in the following description, circuitry 20 is assumed to comprise processor 22, and those having ordinary skill in the art will be able to adapt the description for circuitry which does not have a processor.

Elements of circuitry 20 are described below, and are also described in more detail with reference to FIGS. 3 and 4.

The description herein of circuitry 20, and of operations performed by the circuitry, assumes that the circuitry is configured to operate for a Galois Field of $2^m$ elements, where m is any even integer. Those having ordinary skill in the art will be able to adapt the description, mutatis mutandis, for the case when m is a previously known value. For clarity, the description below describes elements of the circuitry, and steps of the flowchart, that may not be required if m is a known value.

In an initial step 100 of the flowchart, processor receives an element k of a Galois Field, which is assumed to comprise $2^m$ elements, where m is an even integer, and m≥2. The number of elements in the corresponding multiplicative group of the Galois Field, i.e., the order of the group, is $2^m-1$, which is divisible by 3 (since m is even).

The following description assumes that the order of the group of the Galois Field may also be divisible by 9, but, for simplicity and clarity, that the order is not divisible by a higher power of 3, such as $3^3$. Those having ordinary skill in the art will be able to adapt the description, mutatis mutandis, for Galois Field groups having orders that are divisible by higher powers of 3.

In a first comparison 102, performed in a divisible by 9 check set of components 24 of circuitry 20, the order of the group is checked for divisibility by 9. If the order is not divisible by 9, then the flowchart continues to a subset 104 of steps of the flowchart, performed in a divisible by 3 system set of components 30. If the order is divisible by 9, then the flowchart continues to a subset 106 of steps of the flowchart, performed in a divisible by 9 system set of components 34.

If m is a previously known value, then step 102 may not be required, and the flowchart may proceed directly to subset 104 or subset 106, depending on the value of m. In one embodiment m=10, so that the order is $2^{10}-1=1023$, which is not divisible by 9, so that in this case subset 104 of the flowchart applies. In an alternative embodiment m=12, so that the order is $2^{12}-1=4095$ which is divisible by 9 so that subset 106 of the flowchart applies.

Subset 104 of steps of the flowchart is based on the following reasoning.

a. If k has a cubic root, then there exists some j such that $k=\alpha^{3j}$, where $\alpha$ is the primitive of the Galois Field.

b. $2^m-1=3 \cdot R$, where R is a positive integer not divisible by 3. (The cases where R is divisible by 3 are covered in subset 106 of the flowchart.)

Since $\alpha^{(2^m-1)j}=1$, we have $\alpha^{(3 \cdot R)j}=k^R=1$ if and only if ("iff") k has a cubic root.

Note that $k^R \cdot k = k^{(R+1)}=k$ iff k has a cubic root.

c. If (R+1) is divisible by 3, (R+1)=3·r, where r is a positive integer. Thus we can write; $k^{3 \cdot r}=k=\alpha^{3j}$ iff k has a cubic root d. So $k^r = \alpha^j = \sqrt[3]{k}$ e. If (R+1) is not divisible by 3, form (2R+1). This is divisible by 3, so that (2R+1)=3·s, where s is a positive integer. Thus we can write; $k^{3 \cdot s}=k^{2R} \cdot k = \alpha^{3j}$ iff k has a cubic root f. So $k^s = \alpha^j = \sqrt[3]{k}$ Both r and s are multiplicative inverses of $$3 \bmod \left( \frac{2^m - 1}{3} \right),$$

and expressions for r and s are given by the following equations (derived from the steps b, c, and e):

$$r = \frac{\frac{2^m - 1}{3} + 1}{3} \tag{1}$$

$$s = \frac{2\left(\frac{2^m - 1}{3}\right) + 1}{3} \tag{2}$$

Returning to the flowchart, in an exponentiation step 110, the processor raises k to a power that is a function of m, denoted herein as $f_1(m)$, to form a parameter z. An expression for z is given by equation (3), and depends on whether the value of (R+1) is or is not divisible by 3.

$$z = k^{f_1(m)} = \begin{cases} k^r \\ k^s \end{cases} \tag{3}$$

where r, s are defined by equations (1) and (2);
$z=k^r$ is evaluated if (R+1) is divisible by 3;
$z=k^s$ is evaluated if (R+1) is not divisible by 3.

In a cubing step 112, the processor evaluates an expression for $z^3$, and in a condition step 114, that checks if the value found is a valid cube root, the processor compares the value of $z^3$ with k. If step 114 returns positive, i.e., if $z^3 \equiv k$, then z is one of the valid cube roots of k.

In a cube root step 116, the processor finds the other cube roots of k by multiplying z by $\phi$, and by $\phi^2$, where $\phi$ is a cube root of unity. As is known in the art, a cube root of unity is an element, which when raised to a power 3, returns a value of unity. The processor outputs the three cubic roots of k as z, z$\phi$, and z$\phi^2$. Throughout the present application it will be understood that a reference to a root of unity, in this case a reference to a cube root of unity, assumes that the root is a function of the Galois field GF($2^m$).

If step 114 returns negative, i.e., if $z^3 \not\equiv k$, then the flowchart terminates in a final step 118, indicating that k does not have a cube root.

For the embodiment referred to above, where m=10, then subset 104 of the flowchart applies. In this case R=341, and, since (R+1) is divisible by 3, $$r = \frac{(R+1)}{3} = 114.$$

Thus, $k^{114} = \sqrt[3]{k} = z$, and the cube roots are z, z$\phi$, and z$\phi^2$, i.e., $k^{114}$, $k^{114}\phi$, and $k^{114}\phi^2$, if a cube root exists, i.e., if $z^3 \equiv k$.

Returning to the flowchart, subset 106 of steps of the flowchart is based on the following reasoning.

a. If k has a cubic root, then there exists some j such that $k=\alpha^{3j}$.

b. Find R, the largest divider of $2^m-1$ for which GCD(R, 3)=1.

R is, by definition, not divisible by 3, and $k^{3 \cdot R} = \alpha^{(2^m-1)j}=1$ iff k has a cube root, so that $k^R \in \{1, \phi, \phi^2\}$.

c. If (R+1) is divisible by 3, (R+1)=3·t, where t is a positive integer. Thus we can write $k^{(R+1)}=k^{3 \cdot t}$.
Thus $k^{3 \cdot t} \in \{k, \phi k, \phi^2 k\}$ iff k has a cube root.

d. So $k^t \in \{\sqrt[3]{k}, \sqrt[3]{\phi k}, \sqrt[3]{\phi^2 k}\}$ iff k has a cube root.

e. If (R+1) is not divisible by 3, form (2R+1). This is divisible by 3, so that (2R+1)=3·v, where v is a positive integer. Thus we can write $k^{(2R+1)}=k^{3 \cdot v}$.
Thus $k^{3 \cdot v} \in \{k, \phi k, \phi^2 k\}$ iff k has a cube root.

f. So $k^v \in \{\sqrt[3]{k}, \sqrt[3]{\phi k}, \sqrt[3]{\phi^2 k}\}$ iff k has a cube root.

Both t and v are multiplicative inverses of $$3 \bmod \left( \frac{2^m - 1}{9} \right),$$

having explicit expressions given by the following equations:

$$t = \frac{\frac{2^m - 1}{9} + 1}{3} \tag{4}$$

$$v = \frac{2\left(\frac{2^m - 1}{9}\right) + 1}{3} \tag{5}$$

In subset 106 of the steps of the flowchart, in an exponentiation step 130, the processor raises k to a power that is a function of m, denoted as $f_2(m)$, to form a parameter z. An expression for z is given by equation (6), and depends on whether the value of (R+1) is or is not divisible by 3.

$$z = k^{f_2(m)} = \begin{cases} k^t \\ k^v \end{cases} \tag{6}$$

where t, v are defined by equations (4) and (5);
$z=k^t$ is evaluated if (R+1) is divisible by 3;
$z=k^v$ is evaluated if (R+1) is not divisible by 3.

In a cubing step 132, the processor cubes the value found in step 120, so generating $z^3$. The processor then proceeds to check if $z^3$ is a valid cube root, or if it can generate a valid cube root, in a series of condition checking steps 134A, 134B, and 134C.

In condition 134A, the processor checks if $z^3 \equiv k$. If the condition returns positive, then in a step 136 a variable y is equated to z.

If condition 134A returns negative then the processor proceeds to condition 134B, where the processor checks if $z^3 \equiv \phi k$. If the condition returns positive, then in a step 138 variable y is equated to $$z\varphi^{-\frac{1}{3}}.$$

If condition 134B returns negative then the processor proceeds to condition 134C, where the processor checks if $z^3 \equiv \phi^2 k$. If the condition returns positive, then in a step 140 variable y is equated to $$z\varphi^{-\frac{2}{3}}.$$

If condition 134C returns negative then the flowchart terminates in a final step 148, indicating that k does not have a cube root.

From steps 136, 138, or 140, the processor proceeds to a final cube step 146, wherein the value of y is used to calculate the cube roots of k as y, y$\phi$, and y$\phi^2$.

For the alternative embodiment referred to above, where m=12, then subset 106 of the flowchart applies. In this case R=455, and, since (R+1) is divisible by 3, $$t = \frac{R+1}{3} = 152,$$

and z=$k^{152}$. Thus y=$k^{152}$, $k^{152}$ $$\varphi^{-\frac{1}{3}},$$

or $k^{152}$ $$\varphi^{-\frac{2}{3}}$$

and the cube roots of k, if such a root exists, are {y, y$\phi$, y$\phi^2$}.

As stated above, circuitry 20 performs the steps of the flowchart, and the description below provides further details of the elements of the circuitry that implement the flowchart.

Figure 3:
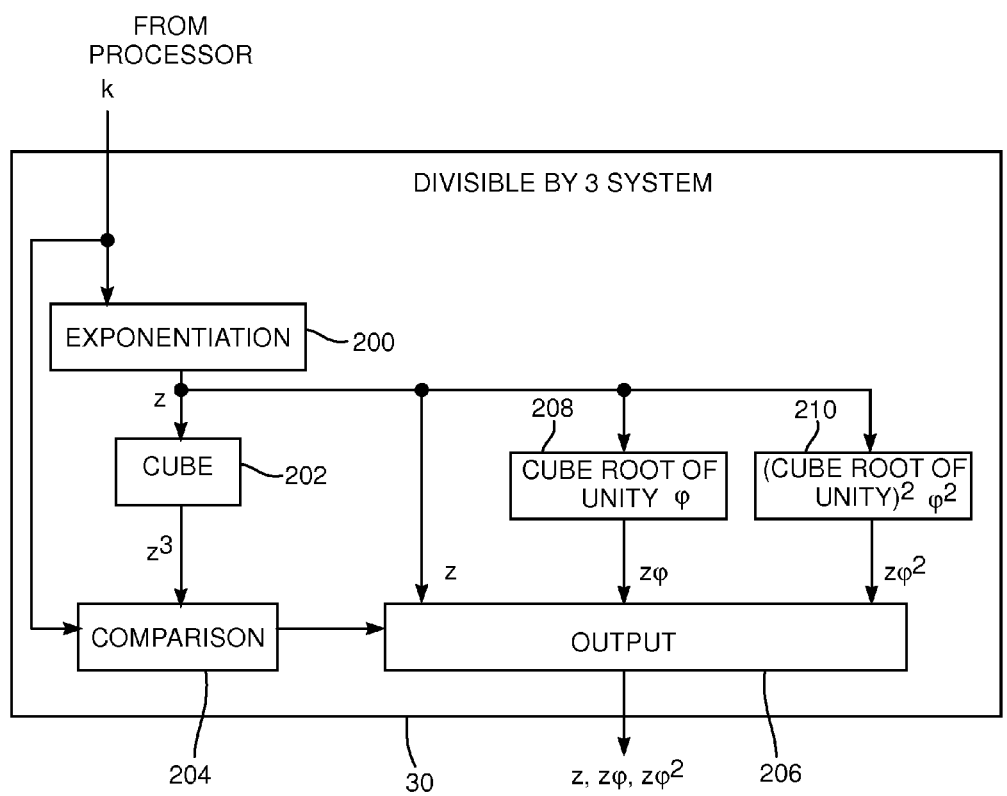
FIG. 3 is a schematic block diagram of a set of components of the circuitry, in accordance with an embodiment that is described herein.

FIG. 3 is a schematic block diagram of the divisible by 3 system set of components of circuitry 20, in accordance with an embodiment that is described herein. Components 30 comprise an exponentiation block 200, which receives the value of k from processor 22. Under direction from the processor, block 200 generates the value of z according to step 110, i.e., block 200 generates z as $k^r$ or $k^s$ according to equation (3). Typically the implementation is field dependent, so that, for example, the values of the cubic roots of unity depend on the field.

If m is a previously known value, then exponentiation block 200, as well as other blocks in components 30, may be configured specifically for the known value of m. In cases where m is not predetermined, processor 22 configures blocks 200-210 according to the value of m.

Exponentiation block 200 transfers its value of z to a cube block 202, which calculates $z^3$, and a comparison block 204 compares the values of k and $z^3$. Blocks 202 and 204 respectively implement steps 112 and 114 of the flowchart. From the comparison made in block 204, the block outputs an indication whether or not a valid cube root of k exists. By way of example the indication is herein assumed to comprise a flag that is set by the comparison block in the event that a valid cube root exists, and that is unset in the event that there is no valid cube root. Thus, if comparison block 204 finds that that $z^3 \equiv k$, the block sets the flag. If the comparison block finds that $z^3 \not\equiv k$, the block unsets the flag.

The flag is passed to an output block 206. Block 206 also receives three other values: the value of z from exponentiation block 200, a value of the product z$\phi$ formed in a cube root of unity block 208, and a value of z$\phi^2$ formed in a (cube root of unity)$^2$ block 210. If the flag received by output block 206 is set, indicating that valid cube roots of k exists, the output block outputs as the cube roots of k {z, z$\phi$, z$\phi^2$}. If the flag is unset, block 206 provides no outputs. It will be understood that for the embodiment wherein m=10, referred to above, divisible by 3 set of components 30 outputs as the cube roots of k, if a cube root exists, {$k^{114}$, $k^{114}\phi$, $k^{114}\phi^2$}.

Figure 4:
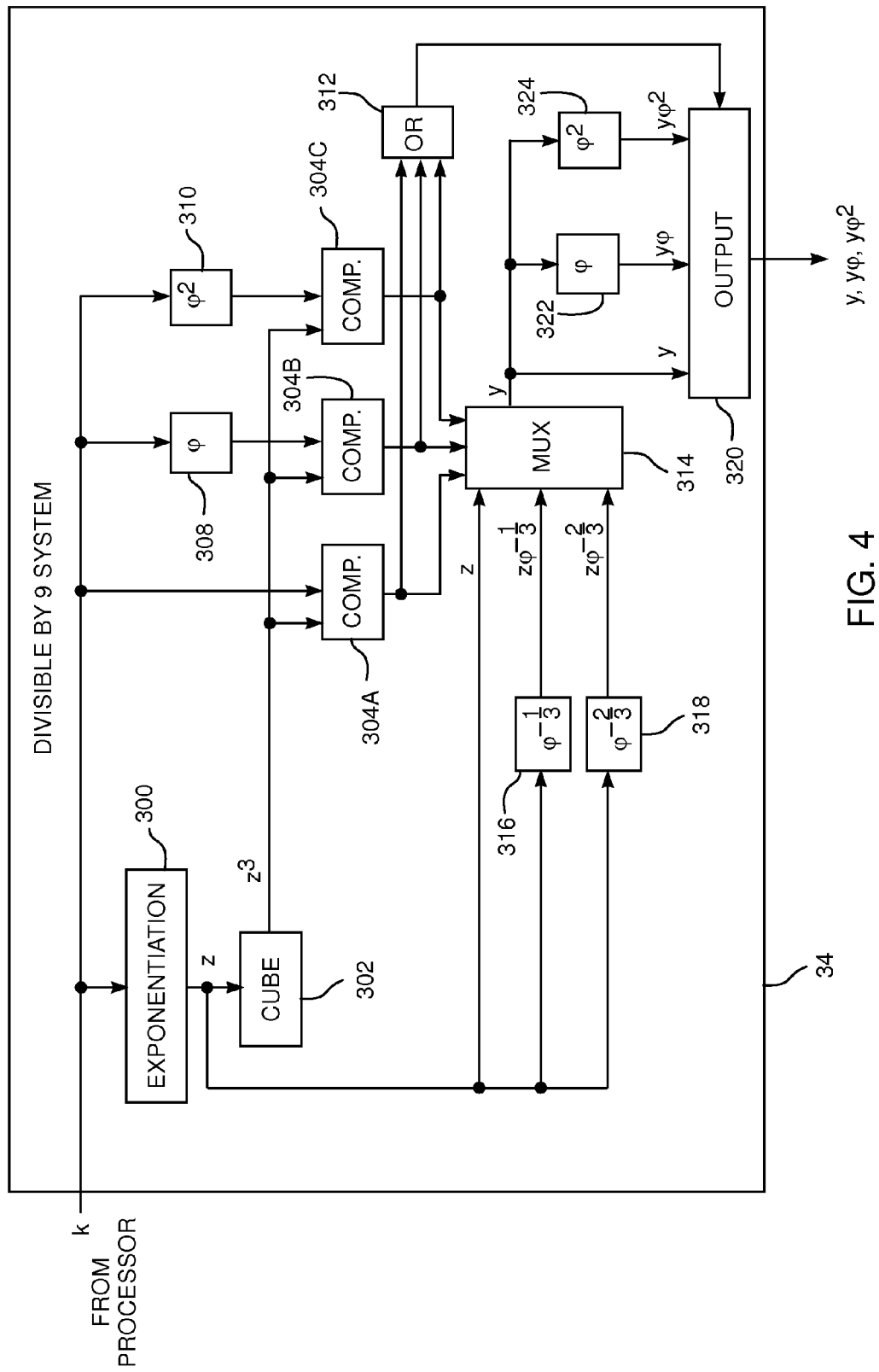
FIG. 4 is a schematic block diagram of another set of components of the circuitry, in accordance with an embodiment that is described herein.

FIG. 4 is a schematic block diagram of the divisible by 9 system set of components 34 of circuitry 20, in accordance with an embodiment that is described herein. As stated above, components 34 are implemented to perform subset 106 of the steps of the flowchart of FIG. 2. In transferring operations to components 34, processor 22 provides the value of k to an exponentiation block 300, which generates the value of z according to step 130, i.e., block 300 generates z as $k^t$ or $k^v$ according to equation (6). Typically, the operations of other blocks within divisible by 9 set of components 34 are also configured by processor 22, as required. If m is a previously known value, then blocks in components 34 may be configured specifically for the known value of m. In cases where m is not predetermined, processor 22 configures components 34 according to the value of m.

Exponentiation block 300 transfers its value of z to a cube block 302, which calculates $z^3$.

The value $z^3$ is transferred to three comparison blocks 304A, 304B, and 304C, which respectively perform the comparisons of steps 134A, 134B, and 134C of the flowchart. In order to perform their comparisons blocks 304A, 304B, and 304C respectively use values of k, k$\phi$, and k$\phi^2$, the former value being as received from processor 22, the latter two values being generated from k by multiplication in a cube root of unity block 308 and a (cube root of unity)$^2$ block 310.

If a comparison of block 304A, 304B, or 304C returns valid, the block is assumed to output a value '1'. If a comparison returns invalid, the block is assumed to output a value '0'.

The outputs of the comparison blocks are provided to an OR gate 312, and also to a multiplexer 314. The multiplexer also receives a value of z from exponentiation block 300, and values of $$z\varphi^{-\frac{1}{3}} \text{ and } z\varphi^{-\frac{2}{3}},$$

respectively derived from multiplying z in a $$\varphi^{-\frac{1}{3}}$$

block 316 and in a $$\varphi^{-\frac{2}{3}}$$

block 318.

If comparison block 304A returns valid, multiplexer 314 provides input value z as an output y; if comparison block 304B returns valid, the multiplexer provides input value $$z\varphi^{-\frac{1}{3}}$$

as output y; and if comparison block 304C returns valid, the multiplexer provides input value $$z\varphi^{-\frac{2}{3}}$$

as output y.

The value y is transferred to an output block 320. Output block 320 also receives values of $y\phi$ and $y\phi^2$, respectively generated by multiplication of y in a cube root of unity block 322 and in a (cube root of unity)$^2$ block 324.

If one of comparison blocks 304A, 304B, and 304C returns valid, then OR gate 312 outputs a value '1'. If none of the comparison blocks returns valid, then the OR gate outputs a value '0'. The output of the OR gate is transferred to output block 320.

If output block 320 receives '1' from the OR gate, indicating that there is a valid cube root of k, then the output block outputs as the cube roots y, $y\phi$ and $y\phi^2$. If the output block receives '0' from the OR gate, indicating there is no valid cube root of k, then the output block does not provide an output.

It will be understood that for the embodiment wherein m=12, referred to above, divisible by 9 set of components 34 outputs as the cube roots of k, if a cube root exists, $\{y, y\phi, y\phi^2\}$.

The description above, with reference to FIGS. 1-4, refers to determining cube roots of an element of a Galois Field. The description may be generalized to determine any root of a Galois Field element, as is explained below.

Figure 5:
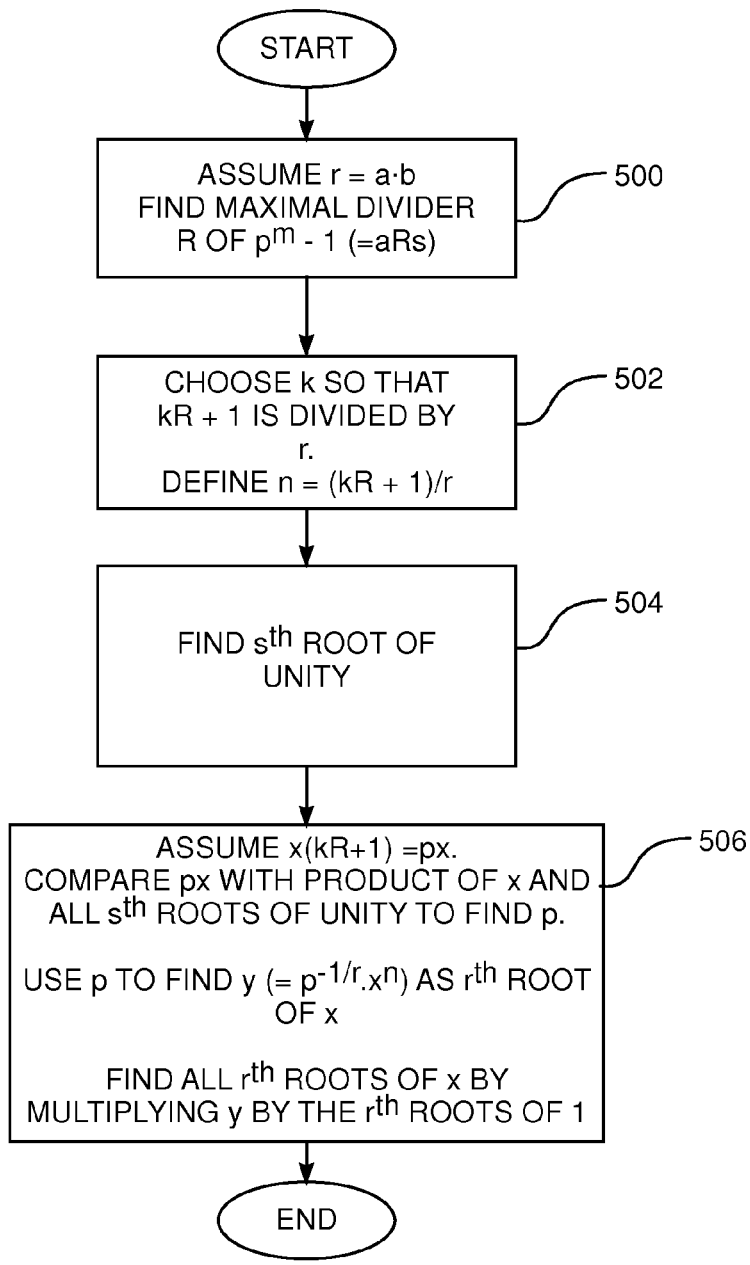
FIG. 5 is a flowchart describing steps in finding roots of an element in a cyclic group of a Galois Field in accordance with an embodiment that is described herein.

FIG. 5 is a flowchart describing steps in finding the $r^{th}$ root of an element x in the cyclic group of GF($p^m$), in accordance with an alternative embodiment that is described herein.

The flowchart assumes that r=ab, that p is a prime, that a, b, are positive or negative integers, so that r may be positive or negative, and that m is a positive integer. It will be understood that r may be equal to −1, (or to other negative values) so that the flowchart may be used to find an inverse. A processor such as processor 22 may implement the flowchart.

In a decomposition step 500, the cyclic group is decomposed according to the following procedure:

Decompose r such that r=ab, where a=GCD(r,$p^m$−1)

Assume $p^m$−1=q=aRs where R is a maximal divider of $p^m$−1 such that 1=GCD(R,a) and 1≤GCD(a,s)

In a selection step 502 a value of k is chosen according to the following procedure:

Since R divides $p^m$−1 but 1=GCD(R,a) and a GCD(q,a), then 1=GCD(R,r).

Choose k such that kR+1 is divided by r, and define $$n = \frac{kR+1}{r}$$

In an $s^{th}$ root step 504 find an expression for the $s^{th}$ roots of 1 according to the following procedure:

Assume x has an $r^{th}$ root, so for a primitive element α of GF ($p^m$) there is a value j where X=$\alpha^{rj}=\alpha^{abj}$ We can write the following:

$$x^{sR}=\alpha^{absRj}=\alpha^{qbj}=1^{bj}=1$$

Therefore $x^R \in \{1, \phi, \phi^2, \ldots, \phi^{(s-1)}\}$ where $\phi$ is an $s^{th}$ root of unity, generating all s roots of unity (for example, $\phi$ may not be equal to unity).

$$x^{kR} = 1^{\frac{k}{s}} = p$$

where p is one of the set of $s^{th}$ roots of unity.

In an $r^{th}$ root step 506 find an expression for the $r^{th}$ roots of element x according to the following procedure:

Using $x^{nr}=x^{(kR+1)}=px$, compare px to the product of x and all $s^{th}$ roots of unity to find p.

Set $$z = p^{-\frac{1}{r}}$$

if p exists. Otherwise, declare no root of x.

Note $$x^n = x^{\frac{(kR+1)}{r}} = x^{\frac{kR}{r}} \cdot x^{\frac{1}{r}} = p^{\frac{1}{r}} \cdot x^{\frac{1}{r}}$$

So we can write $$y = z \cdot x^n = p^{-\frac{1}{r}} \cdot x^n = p^{-\frac{1}{r}} \cdot p^{\frac{1}{r}} \cdot x^{\frac{1}{r}} = x^{\frac{1}{r}}$$

I.e., y is an $r^{th}$ root of x.

Find all the $r^{th}$ roots of x by multiplying y by the $r^{th}$ roots of 1.

Embodiments described herein also include further generalizations to find any $r^{th}$ root of a Galois Field element x, as are described below.

A first generalization occurs when r divides $2^m-1$ but $r^2$ does not.

In such a case, we follow the outlines of FIG. 3.

Notation:

$$R=(2^m-1)/r.$$

$\phi$=r-th root of unity which generates all r-roots of unity by $\phi^j$, j=0, ..., r−1.

a. We define n as the inverse of r (mod R), i.e., n=(kR+1)/r, for some k=0, ..., r−1.
b. We create z=$x^n$.
c. We check $z^r$==x. If the equivalence does not hold, there's no r-th root.
d. If $z^r$==x, the r outputs are given by $\{z, z*\phi, z*\phi^2, \ldots, z*\phi^{(r-1)}\}$.

The first generalization uses, as is illustrated in FIG. 3, one comparison block.

A second generalization occurs when $r^2$ divides $2^m-1$ but $r^3$ does not. Using this method requires knowledge of the unity r-roots in $GF(p^m)$. The roots may be determined by a number of methods which will be apparent to those having ordinary skill in the art, such as on-the-fly calculation, or by calculating a root from one or more other roots.

In such a case, we follow the outlines of FIG. 4.

Notation:

$$R=(2^m-1)/r^2.$$

$\Phi$=r-th root of unity which generates all r-roots of unity by $\phi^j$, $j=0, \ldots, r-1$.
  a. We define n as the inverse of r (mod R), i.e., $n=(kR+1)/r$, for some $k=0, \ldots, r-1$.
  b. We create $z=x^n$.
  c. We check $z^r$ against all elements in $\{x, x*\phi, x*\phi^2, \ldots, x*\phi^{(r-1)}\}$. If none of the equivalences hold, there's no r-th root.
  d. If $z^r=x*\phi^j$ for some $j=0, \ldots, r-1$, set $y=\phi^{(-j/r)}$. This may be pre-configured in the circuitry, similar to FIG. 4.
  e. The r outputs are given by $\{zy, zy*\phi, zy*\phi^2, \ldots, zy*\phi^{(r-1)}\}$ The second generalization uses r comparison blocks. FIG. 4 illustrates the case for r=3.

A third generalization occurs when $r^{(p+1)}$ divides $2^m-1$ but $r^{(p+2)}$ does not, p>1. Using this method requires knowledge of the unity r-roots in $GF(p^m)$. (Methods for finding the roots are referred to above.)

In such a case, we follow the outlines of FIG. 4, and use further comparison and multiplier blocks.

Notation:

$$R=(2^m-1)/r^{(p+1)}.$$

$\Phi$=r-th root of unity which generates all r-roots of unity by $\phi^j$, $j=0, \ldots, r-1$.
  f. We define n as the inverse of r (mod R), i.e., $n=(kR+1)/r$, for some $k=0, \ldots, r-1$.
  g. We create $z=x^n$.
  h. We check $z^r$ against all elements in $\{x, x*\phi, x*\phi^2, \ldots, x*\phi^{(r^p-1)}\}$.
  i. If none of the equivalences hold, there's no r-th root.
  j. If $z^r=x*\phi^j$ for some $j=0, \ldots, r^p-1$, set $y=\phi^{(-j/r)}$. This may be pre-configured in the circuitry, similar to FIG. 4.
  k. The r outputs are given by $\{zy, zy*\phi, zy*\phi^2, \ldots, zy*\phi^{(r-1)}\}$ The third generalization uses $r^p$ comparison blocks.

Figure 6:
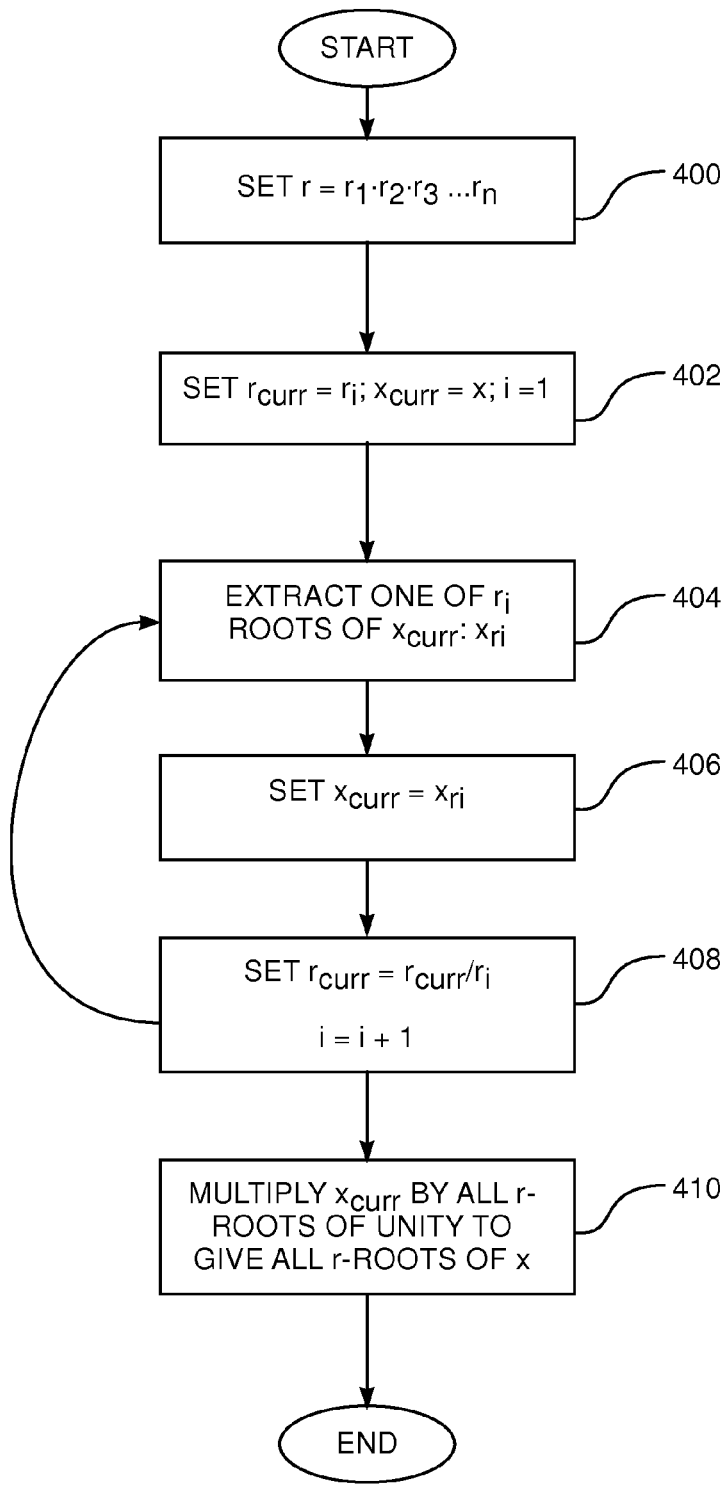
FIG. 6 is a flowchart describing steps in finding roots of an element in a cyclic group of a Galois Field in accordance with an alternative embodiment that is described herein.

FIG. 6 is a flowchart describing steps in finding the $r^{th}$ root of an element x in the cyclic group of $GF(p^m)$, in accordance with an embodiment that is described herein. The flowchart assumes that p and m are integers, p is prime and m>=1, and operates by sequentially extracting roots of lower order. A processor such as processor 22 may implement the flowchart. The flowchart requires knowledge of the unity r-roots in $GF(p^m)$. (Methods for finding the roots are referred to above.)

In a decomposition step 400, the value of r is decomposed according to $r=r_1 \cdot r_2 \ldots r_n$, where all $r_i$ are positive or negative integers not equal to one. This decomposition is not necessarily unique. An optimal decomposition may depend on the values of q, m and r. The decomposition may be predetermined, or determined online using any method, in a manner that will minimize memory requirements, reduce die or code size, increase throughput or reduce latency, as required by the specific application.

In a preliminary step 402, an index i is set equal to 1, a current value $r_{curr}$ is set equal to $r_i$, and a current value $x_{curr}$ is set equal to x.

Steps 404-208, described below, are performed iteratively, while $r_{curr} \neq r_1$.

In a root extraction step 404, one of the $r_i$ roots of $x_{curr}$ is extracted using the appropriate actions of the flowchart of FIG. 5 (i.e., without multiplying by all r-roots of unity). The root is equated to $x_{ri}$. If the flowchart of FIG. 5 returns that no root exists, then no r-roots of x exists, and the present flowchart ends.

In a current x-value step 406, $x_{curr}$ is equated to $x_{ri}$.

In a current r-value step 408 $r_{curr}$ is equated to $$\frac{r_{curr}}{r_i}.$$

Index i is then incremented to i+1.

When the iteration of steps 404-408 completes, then in a final step 410 of the flowchart the value of $r_{curr}$ determined by the iteration is multiplied by all the r-roots of unity to give all the r-roots of x.

The embodiments described herein address circuitry and methods for finding the root of an element of a Galois Field, and may be used in the fields of error correction codes, and in encryption, decryption, and/or cracking in cryptography. For example, decoding a corrupted code word of a Reed-Solomon code or a BCH code may require determining an associated error locator polynomial, transforming the error locator polynomial to a degree three polynomial, and finding the roots of the degree-three polynomial. Finding the roots of the polynomial in turn requires finding the cube root of a Galois Field element, so that implementing an embodiment described herein for finding such a root reduces the time required for the decoding. The roots of the polynomial are used to identify the locations of errors in the code and the errors are corrected.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art.

The invention claimed is:

1. A method, comprising:
   receiving, by at least one processor of a circuit, a corrupted code word of an error correction code;
   determining a degree-three polynomial from the received corrupted code word;
   determining for the degree-three polynomial, a corresponding first element of a Galois Field of order $q^m$, where q is a prime number and m is a positive integer;
   raising, by the at least one processor, the first element to a predetermined power so as to form a second element z, wherein the predetermined power is a function of $q^m$ and an integer p, where p is another prime number which divides $q^m-1$;
   raising, by the at least one processor, z to a $p^{th}$ power to form a third element;
   when the third element equals the first element, outputting, by the at least one processor, as at least one root of the first element the second element multiplied by a $p^{th}$ root of unity raised to a respective power selected from a set of integers between 0 and p−1;

identifying locations of errors in the received corrupted code word from the outputted at least one root;

correcting the corrupted code word at the identified locations; and outputting the corrected code word.

2. The method according to claim 1, wherein m is an even integer, q=2, and p=3, so that the at least one root of the first element comprises cube roots thereof.

3. The method according to claim 2, and comprising determining that an order of a group associated with the Galois Field is not divisible by 9.

4. The method according to claim 2, wherein the predetermined power is selected from one of $$\frac{\frac{2^m - 1}{3} + 1}{3} \text{ and } \frac{2\left(\frac{2^m - 1}{3}\right) + 1}{3}.$$

5. The method according to claim 2, wherein m=10, and wherein the predetermined power is 114.

6. The method according to claim 2, and comprising determining that an order of a group associated with the Galois Field is divisible by 9 and not by 27.

7. The method according to claim 2, wherein the predetermined power is selected from one of $$\frac{\frac{2^m - 1}{9} + 1}{3} \text{ and } \frac{2\left(\frac{2^m - 1}{9}\right) + 1}{3}.$$

8. The method according to claim 2, wherein m=12, and wherein the predetermined power is 152.

9. The method according to claim 2, wherein an order of a group associated with the Galois Field is divisible by 9, and comprising, when the third element equals the first element multiplied by the cube root of unity, forming, by the at least one processor, a fourth element as the second element divided by a cube root of the cube root of unity, and outputting as cube roots of the first element the fourth element, the fourth element multiplied by the cube root of unity, and the fourth element multiplied by the cube root of unity squared.

10. The method according to claim 2, wherein an order of a group associated with the Galois Field is divisible by 9, and comprising, when the third element equals the first element multiplied by the cube root of unity squared, forming, by the at least one processor, a fourth element as the second element divided by a cube root squared of the cube root of unity, and outputting as cube roots of the first element the fourth element, the fourth element multiplied by the cube root of unity, and the fourth element multiplied by the cube root of unity squared.

11. An apparatus, comprising:

a decoder configured to receive code words including a corrupted code word, to determine a degree-three polynomial from the received corrupted code word and to determine a corresponding first element of a Galois Field of order $q^m$, where q is a prime number and m is a positive integer, to raise the first element to a predetermined power so as to form a second element z, wherein the predetermined power is a function of $q^m$ and an integer p, where p is another prime number which divides $q^m - 1$, to raise z to a $p^{th}$ power to form a third element, to compare the first and the third elements, in response to determining that the third element equals the first element, to output as at least one root of the first element the second element multiplied by a $p^{th}$ root of unity raised to a respective power selected from a set of integers between 0 and p−1, to identify locations of errors in the received corrupted code word from the outputted at least one root, and to correct the corrupted code word at the identified locations; and an output configured to output the corrected code word.

12. The apparatus according to claim 11, wherein m is an even integer, q=2, and p=3, so that the at least one root of the first element comprises cube roots thereof.

13. The apparatus according to claim 12, and comprising a divisible by 9 set of components configured to determine that an order of a group associated with the Galois Field is not divisible by 9.

14. The apparatus according to claim 12, wherein the predetermined power is selected from one of $$\frac{\frac{2^m - 1}{3} + 1}{3} \text{ and } \frac{2\left(\frac{2^m - 1}{3}\right) + 1}{3}.$$

15. The apparatus according to claim 12, wherein m=10, and wherein the predetermined power is 114.

16. The apparatus according to claim 12, and comprising a divisible by 9 set of components configured to determine that an order of a group associated with the Galois Field is divisible by 9 and not by 27.

17. The apparatus according to claim 12, wherein the predetermined power is selected from one of $$\frac{\frac{2^m - 1}{9} + 1}{3} \text{ and } \frac{2\left(\frac{2^m - 1}{9}\right) + 1}{3}.$$

18. The apparatus according to claim 12, wherein m=12, and wherein the predetermined power is 152.

19. The apparatus according to claim 12 wherein an order of a group associated with the Galois Field is divisible by 9, and comprising a further comparison block which is configured to compare the first and the third element multiplied by the cube root of unity and to output a further indication if the first element equals the third element multiplied by the cube root of unity, and wherein the output block is configured, in response to receipt of the further indication to form a fourth element as the second element divided by a cube root of the cube root of unity, and to output as cube roots of the first element the fourth element, the fourth element multiplied by the cube root of unity, and the fourth element multiplied by the cube root of unity squared.

20. A non-transitory computer-readable medium including instructions that, when executed by at least one processor of a circuit, cause the at least one processor to perform a method, the method comprising:

receiving a corrupted code word of an error correction code;

determining a degree-three polynomial from the received corrupted code word;

determining for the degree-three polynomial, a corresponding first element r of a Galois Field of order $p^m$, where p is a prime and m is a positive integer;

decomposing r as a product $r_1.r_2 \ldots r_n$ of n integers $r_1$, $r_2, \ldots r_n$, where n is a positive integer;

iteratively extracting an $r_i$ root of a current value of the first element, where i is an integer index between 1 and n, to produce a second element;

outputting as $r^{th}$ roots of the first element the second element respectively multiplied by successive elements of a set comprising $r^{th}$ roots of unity;

identifying locations of errors in the received corrupted code word from the outputted at least one root;

correcting the corrupted code word at the identified locations; and outputting the corrected code word.

* * * * *